United States Patent [19]

Scholz

[11] 4,157,567
[45] Jun. 5, 1979

[54] DROPOUT DETECTING CIRCUITRY FOR A FREQUENCY MODULATED CARRIER, PARTICULARLY FOR A VIDEO RECORDER

[75] Inventor: Werner Scholz, Gehrden, Fed. Rep. of Germany

[73] Assignee: TED Bildplatten Aktiengesellschaft AEG-Telefunken-Teldec, Switzerland

[21] Appl. No.: 828,089

[22] Filed: Aug. 26, 1977

[30] Foreign Application Priority Data

Sep. 11, 1976 [DE] Fed. Rep. of Germany ....... 2641078

[51] Int. Cl.² .............................................. H04N 5/76
[52] U.S. Cl. .................................. 358/127; 358/128; 360/38
[58] Field of Search .................... 360/38; 358/128, 127

[56] References Cited

U.S. PATENT DOCUMENTS

| 3,897,379 | 7/1975 | De Francesco | 360/38 |
| 3,909,518 | 9/1975 | Baker | 360/38 |
| 3,912,858 | 10/1975 | Kenney | 360/38 |
| 3,947,873 | 3/1976 | Buchan | 360/38 |

FOREIGN PATENT DOCUMENTS 931525 7/1963 United Kingdom ...................... 360/38

Primary Examiner—Bernard Konick
Assistant Examiner—Alan Faber
Attorney, Agent, or Firm—McGlew and Tuttle

[57] ABSTRACT

The carrier is modulated over a definite frequency deviation range and is demodulated in an FM detector whose output voltage is used in an evaluation circuit to produce a switching pulse representing the dropout. The FM detector is constituted by a demodulator providing a digital output signal having a first value "1" within the deviation range and a second value "0" outside the deviation range. An evaluation circuit is connected to the demodulator and produces the switching pulse responsive to only the second value "0". The demodulator includes an retriggerable monoflop and an edge-triggered D flip-flop, and the FM carrier is supplied to the control input of the retriggerable monoflop and to a first control input of the edge-triggered D flip-flop. One output of the monoflop is connected to a second control input of the D flip-flop and the switching pulse is provided at one of the outputs of the D flip-flop. Two such demodulators may be used, and have unequal pulse durations at the outputs of the respective monoflops and have their outputs connected to the inputs of an AND stage whose output voltage serves as the switching pulse.

6 Claims, 7 Drawing Figures

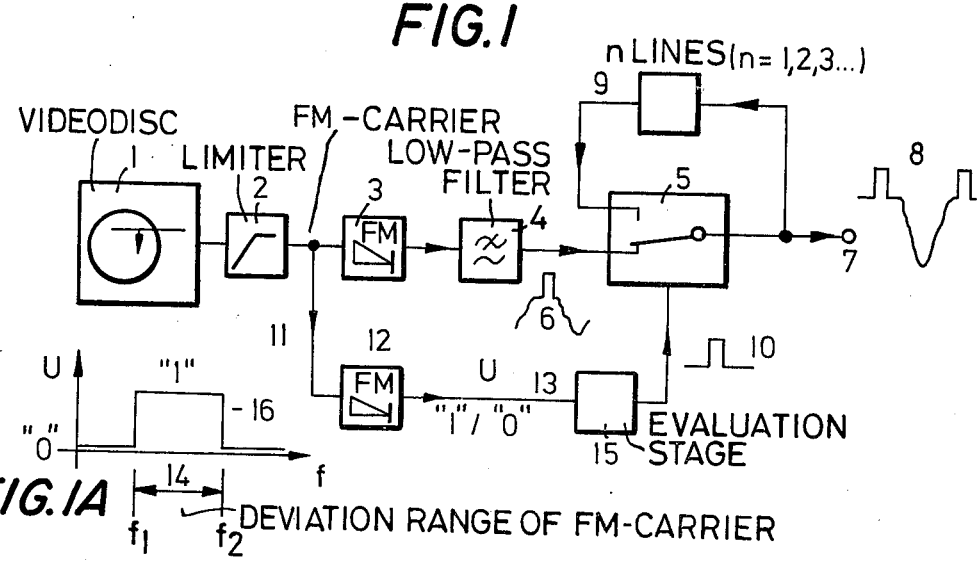
FIG.1
FIG.1A
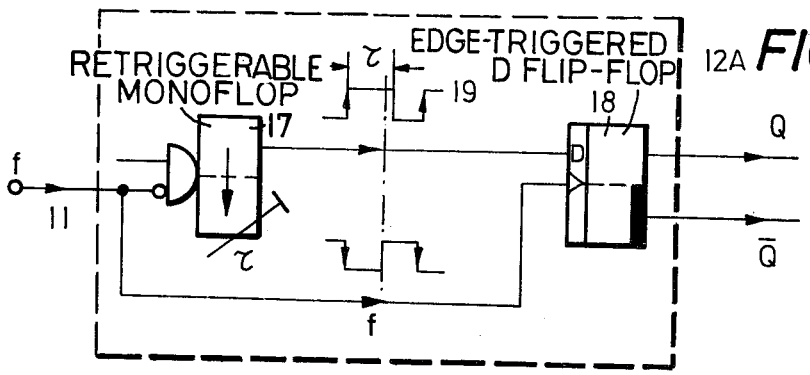
FIG.2
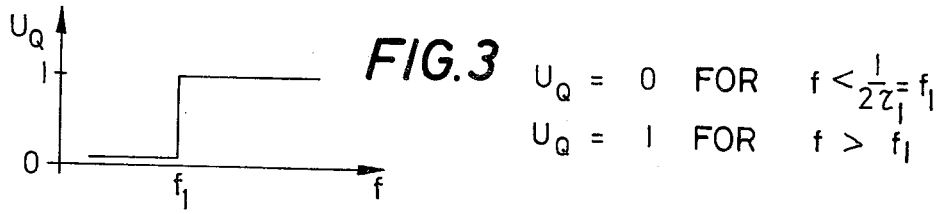
FIG.3  $U_Q = 0$ FOR $f < \frac{1}{2\tau_1} = f_1$
$U_Q = 1$ FOR $f > f_1$
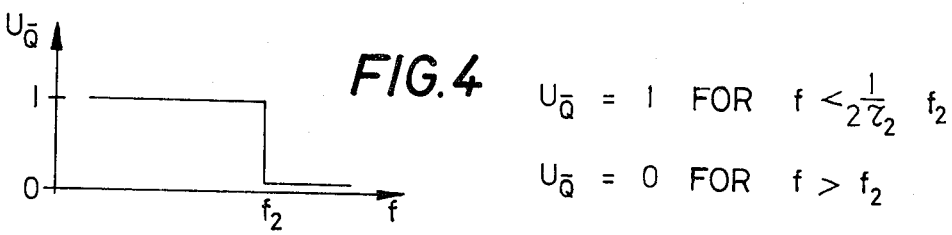
FIG.4  $U_{\bar{Q}} = 1$ FOR $f < \frac{1}{2\tau_2} \; f_2$
$U_{\bar{Q}} = 0$ FOR $f > f_2$

DROPOUT DETECTING CIRCUITRY FOR A FREQUENCY MODULATED CARRIER, PARTICULARLY FOR A VIDEO RECORDER

FIELD AND BACKGROUND OF THE INVENTION

While recording a video signal, for example, on a magnetic tape or a videodisc, the signal, as is well known, is recorded in the form of a frequency modulated carrier, since then the amplitude variations can be eliminated to the largest extent by an amplitude limitation. In such recorders, because of defective spots in the support layer, foreign matter, or a variety of other influences, blackout intervals appear in the modulated carrier to be picked up, which lead to signal absence in the reproduced image, in the form of more or less long horizontal striae. This phenomenon is called dropout.

For reducing the influence of such imperfections, it is known, from German Auslegeschrift No. 12 02 315, which corresponds to British Pat. No. 931,525, to provide a switching pulse, which is obtained in an amplitude rectifier from the modulated carrier as soon as a dropout appears, and to use this pulse for switching the signal path, for the duration of the dropout, to a substitute signal. Then, through the substitute signal path, the signal of a preceding line for example, is furnished by means of a delay circuit, for the duration of one or several lines. A fixed d.c. voltage corresponding to a halftone, or a voltage obtained by integration of the video signal, may also serve as the substitute signal.

Consequently, such circuit arrangements require a detector for determining a dropout and for producing the switching pulse.

In a prior art circuitry (German Offenlegunsschrift No. 25 25 074 which corresponds to U.S. Pat. No. 3,909,518), aside from supplying it to a low-pass filter for obtaining the desired video signal, the output signal of the FM detector is also supplied to a second low-pass filter having a substantially larger bandwidth than the first low-pass filter. The output signal of this second low-pass filter is supplied to a maximum comparator and to a minimum comparator. Each of these two comparators delivers a pulse as soon as the video signal at the output of the second low-pass filter fails to attain a minimum value or exceeds a maximum value. The output voltages of the two comparators are added and the sum serves as a switching pulse for switching the signal path to the substitute signal path upon the occurrence of a dropout. In this design, the demodulated signal must be supplied to the comparators with a large bandwidth. Also, two comparators are needed to detect the dropouts in both directions. Moreover, the produced switching pulse must be extended by additional extension circuits, in order to obtain a sufficiently long period during which the signal path is switched to the substitute signal path.

SUMMARY OF THE INVENTION

The present invention is directed to a simplified dropout detecting circuitry by which, independently of a variety of parameters, such as the instantaneous amplitude of the video signal, the frequency of the dropout, the direction of the dropout, and the like, always a completely satisfactory switching pulse is produced from the dropout.

In the dropout detecting circuitry of the invention, the carrier is modulated over a definite frequency deviation range and demodulated in an FM detector whose output voltage is used in an evaluation circuit for producing a switching pulse representing the dropout. The FM detector is a demodulator with a digital output signal having a first value "1" within the deviation range and a second value "0" outside the deviation range. The evaluation circuit is responsive to only the second signal value "0".

Thus, the FM detector used in accordance with the invention produces, within the deviation range corresponding to the desired video signal, a constant first signal value and, outside this deviation range, where, as a rule, the carrier frequency is present at a dropout, a second signal value. The latter value is then a clear criterion for the occurrence of a dropout. Consequently, any signal content in the FM carrier exceeding in either direction the deviation range produces directly a pulse representing the dropout, completely independently of the instantaneous amplitude of the video signal. Neither a low-pass filter for removing the carrier from the demodulated signal nor a comparison circuit for clipping the dropout pulse out of the demodulated signal are necessary. The period of time between the start of the dropout and the detection thereof is no longer dependent on the rise time of the low-pass filter used in the prior art circuits, nor on the marginal steepness of the demodulation characteristic, i.e. this time no longer depends on the particular amplitude zone of the video signal in which the dropout occurs and on what the frequency of the dropout itself is. The theoretically shortest time for a frequency measurement, namely the duration of a half wave, is sufficient for detecting a dropout. Thereby, advantageously, even the shortest dropouts are detected.

Although the characteristic is quite flat in the deviation range, it is also possible to provide only a single frequency limit. This is an advantage for videodiscs, since therein the dropouts almost always tend to the low frequencies. Then, while cutting the disc, there is no need for limiting the preemphasis peaks which tend to high frequencies. In no instance can they be mistaken for dropouts.

An object of the present invention is to provide improved dropout detecting circuitry for a frequency modulated carrier, particularly for a video recorder.

Another object of the invention is to provide such a dropout detecting circuitry which, independently of a variety of parameters, always produces a completely satisfactory switching pulse responsive to a dropout.

Another object of the invention is to provide such an improved and simplified dropout detecting circuitry which does not require either a low-pass filter or a comparison circuit for clipping the dropout pulse out of the demodulated signal.

Yet another object of the invention is to provide such an improved and simplified dropout circuitry in which the period of time between the start of the dropout and the detection thereof is no longer dependent on the rise time of a low-pass filter nor on the marginal steepness of the demodulation characteristic.

A still further object of the invention is to provide such an improved and simplified dropout detecting circuitry in which even the shortest dropouts are detected.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a basic block circuit diagram of a dropout compensating circuitry for a video recorder;

FIG. 1A illustrates the voltage U;

FIG. 2 is a schematic diagram of the basic construction of an FM detector used in accordance with the invention;

FIGS. 3 and 4 are diagrams illustrating the characteristics of the circuit shown in FIG. 2;

DESCRIPTION OF THE PREFERRED EMBODIMENT

Figure 5:
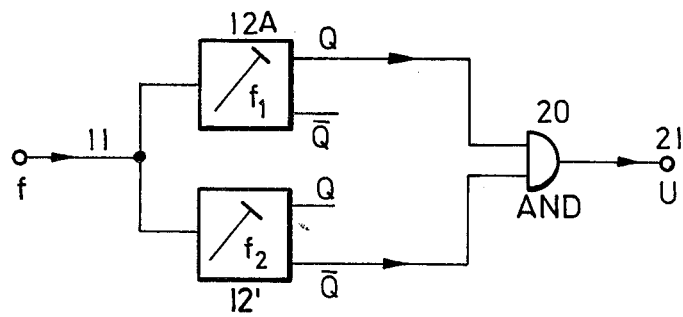
FIG. 5 is a block diagram illustrating the interconnection of two circuits such as shown in FIG. 2.

As shown in FIG. 1, the FM carrier frequency modulated with the video signal is supplied from a videodisc 1 through an amplitude limiter 2 to an FM detector 3 by which, through a low-pass filter 4, the desired signal 6 is furnished. The signal 6 is supplied to the first input of a two-position switch 5, and the video signal, freed from dropouts, appears at the output terminal 7 of switch 5. The substitute signal is applied to the upper input of switch 5 and is obtained, by means of a delay line 9 having a delay time of one or several lines, from the signal present at terminal 7. Upon the occurrence of a dropout, switch 5 is switched, by a switching pulse 10, into its upper position, so that, for the duration of the dropout, the corresponding signal of a line preceding in time is delivered instead at terminal 7. From the output terminal of amplitude limiter 2, the FM carrier is, in addition, directed, through a line 11, to the input of an FM detector 12 by which, as soon as a dropout appears, a voltage U is produced in line 13, by which, in turn, the switching pulse 10 is produced in evaluation stage 15.

As indicated by the characteristic 16 in FIG. 1A, in the deviation range 14 corresponding to the desired video signal 6, voltage U in line 13 is equal to "1." At this value, no pulse is produced at the output terminal of stage 15. Consequently, switch 5 remains in its lower position and conducts the video signal unchanged to terminal 7. Outside deviation range 14, voltage U has the value "0." In this case, a switching pulse 10 is produced at the output of stage 15, by which pulse switch 5 is switched to its upper position, so that the dropout is substituted by the signal of a line preceding in time. Thus, the operation of detector 12 is digital. Within the deviation range, it furnishes always the same voltage. In consequence, it would not be suitable as a demodulator for obtaining the video signal 6, and is designed particularly for producing switching pulses 10 from the dropouts.

The fact that the frequency of the FM carrier appears outside the deviation range is a criterion for the presence of a dropout. Then, independently of the frequency conditions outside the deviation range 14 and due to the digital behavior of demodulator 12, the switching pulse 10 is produced.

FIG. 2 shows a circuit with which the waveform 16 can be produced. The circuit comprises a retriggerable monoflop 17 and an edge-triggered D flip-flop 18, and will be designated in the following as a frequency indicator. The circuit furnishes a digital output voltage depending on whether the frequency f is above or below a certain frequency limit $f_n$. Within the range $f < 1/\tau$, monoflop 17 furnishes, to the D input of flip-flop 18, positive pulses 19 whose duration $\tau$ is independent of f. For $f > 1/\tau$, the output voltage of monoflop 17 remains "1," because of the after triggerability. The pulses of monoflop 17 start with the drooping edge of the input voltage in line 11. The rising edge of the input voltage switches the Q output of flip-flop 18 to the condition which is just present at the D input. This results, for output Q, in the shape of the frequency characteristic as shown in FIG. 3. Thus, at output Q, circuit 12A furnishes, below the frequency $f_1$, the value "0", and above the frequency $f_1$, always the value "1." Oppositely poled voltages apply to output $\overline{Q}$. By varying the pulse duration, the frequency limit, and thus the value of frequency $f_1$, can be adjusted. The frequency indicator according to FIG. 2 is known per se and described in more detail, for example, in the periodical "Elektronikpraxis" No. 7/8, Aug. 1972, page 65.

FIG. 4 shows the voltage at the $\overline{Q}$ output of the frequency indicator, with $\tau$ adjusted to a smaller value, so that the output voltage jumps at a higher frequency $f_2$.

It is clear that by combining two such circuits 12A, the waveform 16 can be obtained. Such a circuit is shown in FIG. 5. The carrier is supplied from line 11 to two frequency indicators 12A and 12' which are adjusted to frequencies $f_1$ and $f_2$. Output Q of indicator 12A and output $\overline{Q}$ of indicator 12' are connected to the inputs of an AND stage 20. It follows from FIGS. 3, 4 that then the waveform 16 according to FIG. 1 is produced for the voltage at the output terminal 21 of stage 20. Consequently, the voltage there present can be used, directly or after a further shaping and amplification, as the switching pulse 10. Stage 15 of FIG. 1 may then be omitted. Frequencies $f_1$ and $f_2$ can be adjusted independently of each other by varying the pulse duration of the monoflops of the two indicators 12A, 12'.

There exist videodisc systems in which, in practice, there occur no dropouts which would exceed the deviation range 14 in the upward direction. In such a case, for detecting dropouts, it is sufficient to provide only one frequency indicator having the characteristic according to FIG. 3, and thus only a single circuit according to FIG. 2. The advantage thereof is that, while cutting the videodisc and as far as the dropout detection is concerned, it is no longer necessary to limit the preemphasis peaks which tend to high frequencies.

Figure 6:
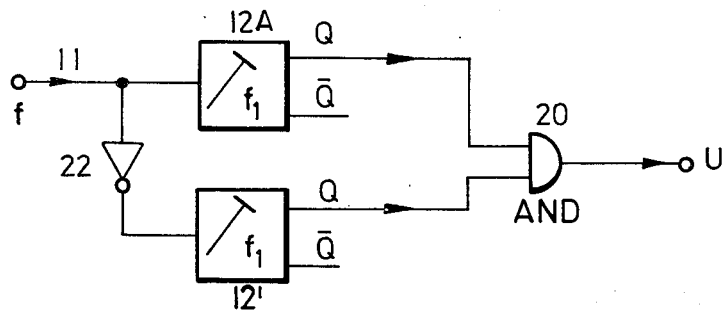
FIG. 6 is a block diagram illustrating a variation of the circuit of FIG. 5.

FIG. 6 shows a circuit which is particularly suitable for detecting dropouts in a videodisc. The circuit again comprises two frequency indicators 12A, 12' in accordance with FIG. 2, whose outputs are connected to an AND stage 20, while an inverter 22 is connected between their inputs. In the circuit of FIG. 2, for monitoring the frequency, only the distance between the drooping and rising edges of the FM carrier is monitored. In the circuit of FIG. 6, however, the distance between the rising and drooping edges is monitored in addition. This is very important, primarily for the time detection of all dropouts and for the detectuon of short dropouts.

The two frequency indicators shown in FIG. 6 are adjusted to the same frequency $f_1$. The voltage U at the output of AND stage 20 corresponds to that of FIG. 3.

By combining two circuits according to FIG. 6, again a circuit according to FIG. 5 can be obtained, with the output voltage having the waveform 16. The stability of the adjusted frequency limits depends on the duration stability of the pulse furnished by monoflop 17.

Figure 7:
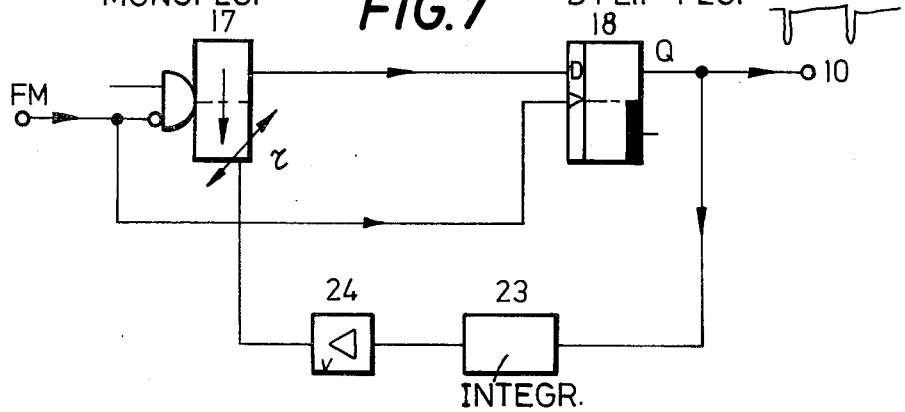
FIG. 7 is a block diagram illustrating an advantageous development of the invention.

Should it be provided to set the frequency limit to a frequency which periodically recurs in the signal, for example, to the frequency for the synchronizing pulses in the FM carrier, then this frequency may be used for an automatic adjustment of the frequency limit. Such a circuit is shown in FIG. 7. The output voltage of flip-flop 18 is integrated in a stage 23 and supplied, through an amplifier 24, to monoflop 17. This voltage controls the pulse duration of monoflop 17. The amount and sign of the amplification is chosen so as to obtain stable operational conditions in which part of the synchronizing pulses are evaluated as dropouts. Thereby, the frequency limit for detecting dropouts is adjusted automatically to the lowest desired signal frequency of the FM signal.

While specific embodiments of the invention have been shown and described in detail to illustrate the application of the principles of the invention, it will be understood that the invention may be embodied otherwise without departing from such principles.

What is claimed is:

1. In a dropout detecting circuit for a frequency modulated carrier, particularly for a video recorder, in which the carrier is modulated over a definite frequency deviation range and is demodulated in an FM detector whose output voltage is used in an evaluation circuit to produce a switching pulse representing the dropout, the improvement comprising, in combination, a demodulator constituting said FM detector and providing a digital output signal having a first value within such deviation range of the carrier and a second value outside such deviation range; and an evaluation circuit connected to said demodulator and producing said switching pulse responsive to only said second value of such digital output signal, said demodulator comprising a re-triggerable monoflop having a control input and an output; and an edge-triggered D flip-flop having first and second control inputs and having outputs; said FM carrier being applied to the control input of said retriggerable monoflop and to said first input of said edge-triggered D flip-flop; said output of said retriggerable monoflop being connected to said second control input of said D flip-flop; such switching pulse being derived at one of the outputs of said D flip-flop.

2. In a dropout detecting circuit for a frequency modulated carrier, the improvement claimed in claim 1, including a second demodulator as claimed in claim 1, both demodulators having the FM carrier supplied thereto and said two demodulators having unequal pulse durations at the output of their respective monoflops; and an AND stage having its input connected to the outputs of said respective monoflops and providing an output voltage serving as a switching pulse.

3. In a dropout detecting circuit for a frequency modulated carrier, the improvement claimed in claim 2, in which mutually inverse outputs of said two flip-flops are connected to the inputs of said AND stage.

4. In a dropout detecting circuit for a frequency modulated carrier, the improvement claimed in claim 2, in which corresponding outputs of said flip-flops are connected to the inputs of said AND stage; and an inverter connected to the input of one of said two monoflops in the path of the FM carrier leading thereto.

5. In a dropout detecting circuit for a frequency modulated carrier the improvement claumed in claim 4, in which the pulse durations of both monoflops are adjusted to the same value.

6. In a dropout detecting circuit for a frequency modulated carrier, the improvement claimed in claim 2, including an integration stage connected to such one output of said D flip-flop and integrating the output voltage of said D flip-flop; and means connecting said integration stage to said monoflop for controlling the pulse width of said monoflop.

* * * * *